United States Patent
Donini et al.

(10) Patent No.: US 11,927,143 B2
(45) Date of Patent: Mar. 12, 2024

(54) CONTROL SYSTEM AND METHOD FOR PROPELLER-SPEED OVERSHOOT LIMITATION IN A TURBOPROPELLER ENGINE

(71) Applicant: GE Avio S.r.l., Rivalta di Turin (IT)

(72) Inventors: Giuseppe Donini, Rivalta di Turin (IT); Stefano Ettorre, Bari (IT); Pierpaolo Forte, Rivalta di Turin (IT)

(73) Assignee: GE Avio S.r.l., Rivalta di Torino (IT)

( * ) Notice: Subject to any disclaimer, the term of this patent is extended or adjusted under 35 U.S.C. 154(b) by 730 days.

(21) Appl. No.: 16/982,289

(22) PCT Filed: Mar. 22, 2019

(86) PCT No.: PCT/EP2019/057333
§ 371 (c)(1),
(2) Date: Sep. 18, 2020

(87) PCT Pub. No.: WO2019/180253
PCT Pub. Date: Sep. 26, 2019

(65) Prior Publication Data
US 2021/0017915 A1    Jan. 21, 2021

(30) Foreign Application Priority Data
Mar. 23, 2018 (EP) .................... 18425019

(51) Int. Cl.
*F02C 9/58* (2006.01)
*F02C 9/28* (2006.01)

(52) U.S. Cl.
CPC .............. *F02C 9/58* (2013.01); *F02C 9/28* (2013.01); *F05D 2220/324* (2013.01); *F05D 2220/325* (2013.01); *F05D 2270/021* (2013.01)

(58) Field of Classification Search
CPC .... F02C 9/58; F02C 9/28; F02C 6/206; F02C 3/10; F05D 2220/324; F05D 2220/325; F05D 2270/021; F05D 2270/304
See application file for complete search history.

(56) References Cited

U.S. PATENT DOCUMENTS

| 4,185,460 A | * | 1/1980 | Moore | ............... F02C 9/42 60/243 |
| 4,276,744 A | * | 7/1981 | Pisano | ............... F02C 9/28 60/791 |

(Continued)

FOREIGN PATENT DOCUMENTS

WO    WO 93/06354 A1    4/1993

OTHER PUBLICATIONS

PCT International Search Report Corresponding to PCT/EP2019/057333 dated May 31, 2019.

*Primary Examiner* — Mussa A Shaawat
(74) *Attorney, Agent, or Firm* — Dority & Manning, P.A.

(57) ABSTRACT

An electronic control system (35) for a turbopropeller (2) having a gas turbine engine (20) and a propeller assembly (3) coupled to the gas turbine engine (20), the control system (35) having: a propeller control stage (35a), implementing a closed loop control for controlling operation of the propeller assembly (3) based on a scheduled propeller speed reference ($Nr_{ref}$) and a propeller speed measure (Nr); a gas turbine control stage (35b), implementing a closed loop control for controlling operation of the gas turbine engine (20) based on a scheduled reference ($Ngdot_{ref}$) and at least a feedback quantity. The control system (35) further envisages an auxiliary control stage (35c), coupling the propeller control stage (35a) and the gas turbine control stage (35b) and determining a limitation of the operation of the gas turbine (Continued)

engine (20), if a propeller speed overshoot is detected, with respect to the propeller speed reference ($Nr_{ref}$).

15 Claims, 4 Drawing Sheets

(56) References Cited

U.S. PATENT DOCUMENTS

| | | | | |
|---|---|---|---|---|
| 4,611,289 | A | * | 9/1986 | Coppola .................. G06F 1/00 713/340 |
| 4,928,241 | A | * | 5/1990 | Day ........................ B64C 11/48 416/34 |
| 4,934,825 | A | * | 6/1990 | Martin ................... B64D 31/12 416/34 |
| 5,017,089 | A | * | 5/1991 | Schneider ............. B64C 11/303 415/17 |
| 5,315,819 | A | | 5/1994 | Page et al. |
| 5,331,559 | A | | 7/1994 | High et al. |
| 10,378,439 | B2 | | 8/2019 | Cedoz et al. |
| 10,738,874 | B2 | | 8/2020 | Altamura et al. |
| 2005/0060982 | A1 | * | 3/2005 | Mani ....................... F02C 7/045 181/213 |
| 2016/0229547 | A1 | * | 8/2016 | Fisher .................... B64D 31/06 |
| 2017/0081038 | A1 | * | 3/2017 | Looper .................. B64D 31/04 |
| 2018/0045123 | A1 | | 2/2018 | Liacu |

\* cited by examiner

CONTROL SYSTEM AND METHOD FOR PROPELLER-SPEED OVERSHOOT LIMITATION IN A TURBOPROPELLER ENGINE

CROSS-REFERENCE TO RELATED APPLICATIONS

This patent application claims priority from European patent application no. 18425019.9 filed on 23 Mar. 2018, the entire disclosure of which is incorporated herein by reference.

TECHNICAL FIELD

The present solution relates to a control system and method for propeller-speed overshoot limitation in a turbopropeller (or turboprop) engine of an aircraft.

BACKGROUND ART

As it is known, a turbopropeller includes a gas turbine engine and a propeller assembly, coupled to the gas turbine engine via a gearbox assembly.

Aircraft solutions are known, in which a single operator-manipulated input device (a power, or throttle, lever) is used by the pilot to input an engine power request; the same input device is also used to determine a propeller pitch angle or setting.

Propeller control is generally based on a closed-loop tracking of propeller speed and/or propeller pitch references, taking into account operating and environmental conditions and the input power request provided via the input device. The output of the control action is generally a driving quantity, e.g. an electric current, that is supplied to a propeller actuation assembly of the turbopropeller engine (e.g. to a servo-valve) to control the pitch angle of the propeller blades, in order to regulate the value of the propeller speed.

In a corresponding manner, gas turbine control is generally based on a feedback tracking of one or more quantities related to engine operation, such as the acceleration (or speed rate of change) of a gas generator, or a measured torque, again taking into account the operating and environmental conditions and the input power request. The output of the control action is generally a driving quantity, e.g. an electric current, that is supplied to a fuel metering unit (FMU) to control the quantity or rate of fuel provided to the gas turbine engine.

During flight, propeller speed overshoot may arise, i.e. a rapid increase of the propeller speed above a set reference speed, which may be caused by a high power increase rate, e.g. due to a maximum power requested by the pilot when the aircraft is flying at high altitude in idle condition and at a certain speed; a propeller speed overshoot may also be caused by a propeller control anomaly.

In these situations, the propeller control action (pitch-based) may not be able to maintain the propeller speed to the reference value, and the propeller may overshoot and reach an overspeed value, leading to a potentially dangerous situation for the aircraft and even to engine-failure.

This situation is schematically depicted in FIG. 1, which shows plots vs time of: a propeller speed measure, denoted with Nr; a torque TQ, that increases quickly according to the power increase, starting from time t0; and a measure of a gas generator acceleration, denoted with Ngdot. FIG. 1 also shows the value of a propeller speed reference $Nr_{ref}$.

As shown in the same FIG. 1, the rapid increase rate of the requested power (and the corresponding increase rate of the gas generator acceleration) causes overshoot of the propeller speed Nr with respect to the propeller speed reference $Nr_{ref}$, reaching a value for example up to 40-50 rpm above the same propeller speed reference $Nr_{ref}$.

The present Applicant has realized that known turbopropeller control solutions may not be able to cope with the above discussed issue concerning propeller speed overshoot, thus not preventing the occurrence of potentially dangerous operating conditions for the aircraft.

DISCLOSURE OF INVENTION

The aim of the present solution is to provide an improved control solution for a turbopropeller engine, allowing to achieve a suitable limitation of propeller-speed overshoot.

According to the present solution, a control system and a control method are therefore provided, as defined in the appended claims.

BRIEF DESCRIPTION OF THE DRAWINGS

For a better understanding of the present invention, preferred embodiments thereof are now described, purely as non-limiting examples, with reference to the attached drawings, wherein.

BEST MODE FOR CARRYING OUT THE INVENTION

Figure 2:
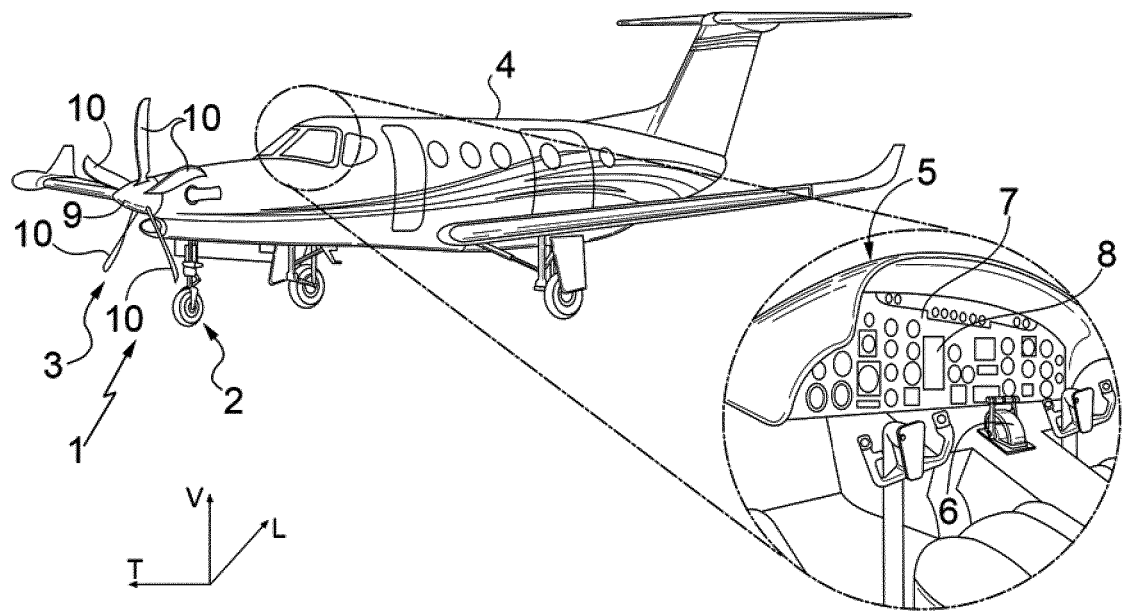
FIG. 2 is a perspective view of an aircraft provided with a turbopropeller engine.

FIG. 2 shows a perspective view of an exemplary aircraft 1, provided with a turbopropeller 2; only a propeller assembly 3 of the turbopropeller 2 is visible in the same FIG. 2.

The aircraft 1 includes an airframe 4 defining a cockpit 5; a single operator-manipulated input device (a power, or throttle, lever) 6 and an instrument control panel 7 having a display 8 are provided within the cockpit 5.

The propeller assembly 3 comprises a hub 9 and a plurality of blades 10 extending outwardly from the hub 9. A gas turbine engine of the turbopropeller 2 (here not shown) generates and transmits power to drive rotation of propeller assembly 3, thus generating thrust for the aircraft 1.

The aircraft 1 defines an orthogonal coordinate system, including three orthogonal coordinate axes. In particular, the three orthogonal coordinate axes include a lateral axis L, a longitudinal axis T, and a vertical axis V. During operation, the aircraft 10 can move along at least one of the lateral axis L, the longitudinal axis T, and the vertical axis V; in particular, forward and reverse operating modes of the aircraft 1 imply movement in respective, and opposing, directions along the longitudinal axis T.

Figure 3:
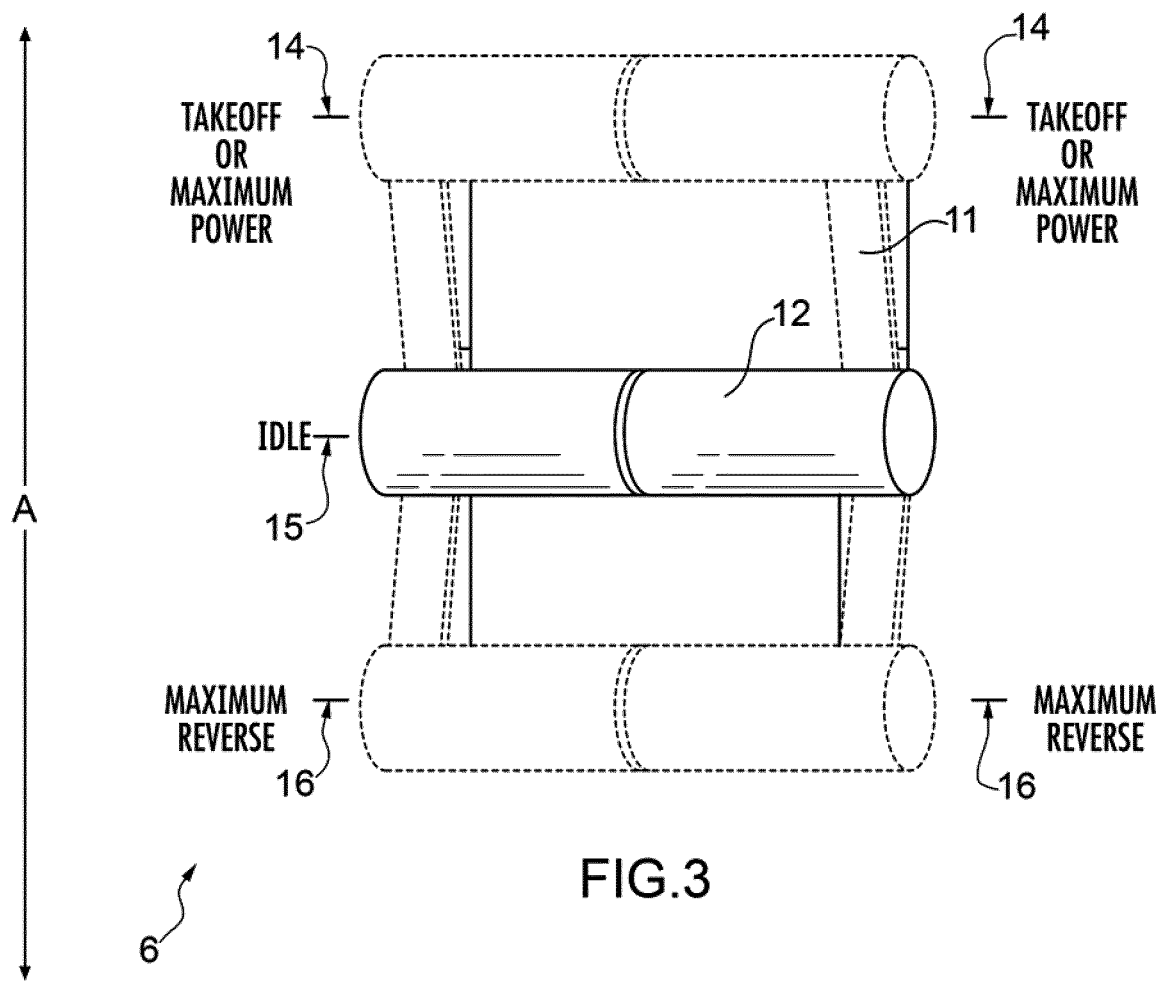
FIG. 3 is a schematic view of an operator input device of the aircraft.

FIG. 3 shows the operator-manipulated input device 6, used by the pilot of the aircraft 1 to control engine power; additionally, the operator-manipulated input device 6 controls a minimum propeller pitch angle or low pitch setting (LPS) based on a position thereof.

In the embodiment depicted, the operator-manipulated input device 6 defines an axial direction A, and includes a lever 11 having a handle 12. The lever 11 is movable along the axial direction A between a first position 14, corresponding to a TAKEOFF or MAXIMUM POWER setting, and a second position 16, corresponding to a MAXIMUM REVERSE setting. Accordingly, moving the lever 11 towards the first position 14 increases thrust of the aircraft 1 in a first direction along the longitudinal axis T, whereas moving the lever 11 towards the second position 16 increases thrust of the aircraft 1 in a second direction along the same longitudinal axis T, opposite to the first direction. In addition, the lever 11 includes one or more of intermediate third positions 15 disposed between the first and second positions 14, 16; in particular, the intermediate third positions 15 can include an IDLE position.

With the single operator-manipulated input device 6, the pilot may set at a same time power (or thrust) and propeller speed requirements. The propeller speed demand or reference $Nr_{ref}$ and power are a function of the lever angular position (or level angle, PLA), according to a predetermined schedule being developed to operate the propeller as close as possible to an optimal operating point, assuming a typical aircraft mission.

Figure 4:
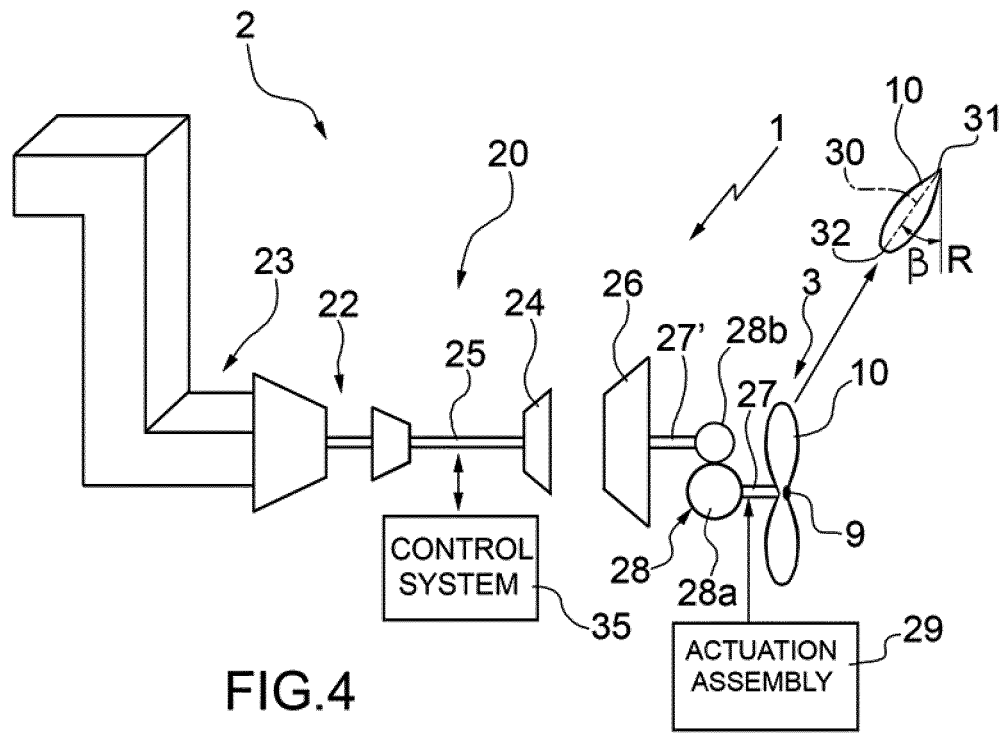
FIG. 4 is a schematic block diagram of the turbopropeller of the aircraft.

As schematically shown in FIG. 4, the gas turbine engine of the turbopropeller 2, here denoted with 20, generally comprises:

- axial/centrifugal compressors 22, coupled to an air intake 23;
- a high-pressure turbine 24, so called "gas generator", coupled to the axial/centrifugal compressors 22 via a gas generator shaft 25; and
- a low-pressure turbine 26, so called "power turbine", mechanically decoupled from the gas generator shaft 25 and driven by hot gas expansion.

The propeller assembly 3 is coupled to the gas turbine engine 20 via a propeller shaft 27 and a gearbox 28.

More specifically, the gearbox 28 can include a first gear 28a and a second gear 28b in mesh with the first gear 28a. The first gear 28a can be connected to the propeller shaft 27, in turn coupled to the hub 9 of the propeller assembly 3, and the second gear 28b can be connected to a power turbine shaft 27', in turn coupled to the low-pressure turbine 26. During operation, the gearbox 28 can step-down a rotational speed of the power turbine shaft 27', so that a rotational speed of the propeller shaft 27 can be less than the rotational speed of the power turbine shaft 27'.

An actuation assembly 29 is coupled to the propeller assembly 3, to control the pitch angle $\beta$ of the propeller blades 10, in order to regulate the value of the propeller speed Nr; as shown in the same FIG. 4, the pitch angle $\beta$ may be defined as the angle between a chord 30 extending between leading and trailing edges 31, 32 of each propeller blade 10 and a direction R about which the propeller blades 10 are rotatable.

The turbopropeller 2 is managed by an electronic control system 35 (shown schematically in FIG. 4), that includes an electronic processing unit (e.g. a microprocessor, a microcontroller, or similar processing unit) provided with a non-volatile memory storing suitable software instructions, in order to implement an engine control strategy to meet an input power demand, originated from the operator-manipulated input device 6. The electronic control system 35 may define one or more of a full authority digital engine controller (FADEC), an engine control unit (ECU), or an electronic engine control (EEC); in particular, according to an embodiment of the present solution, the electronic control system 35 implements both a propeller electronic control (PEC) and a turbine electronic control (TEC).

Figure 5:
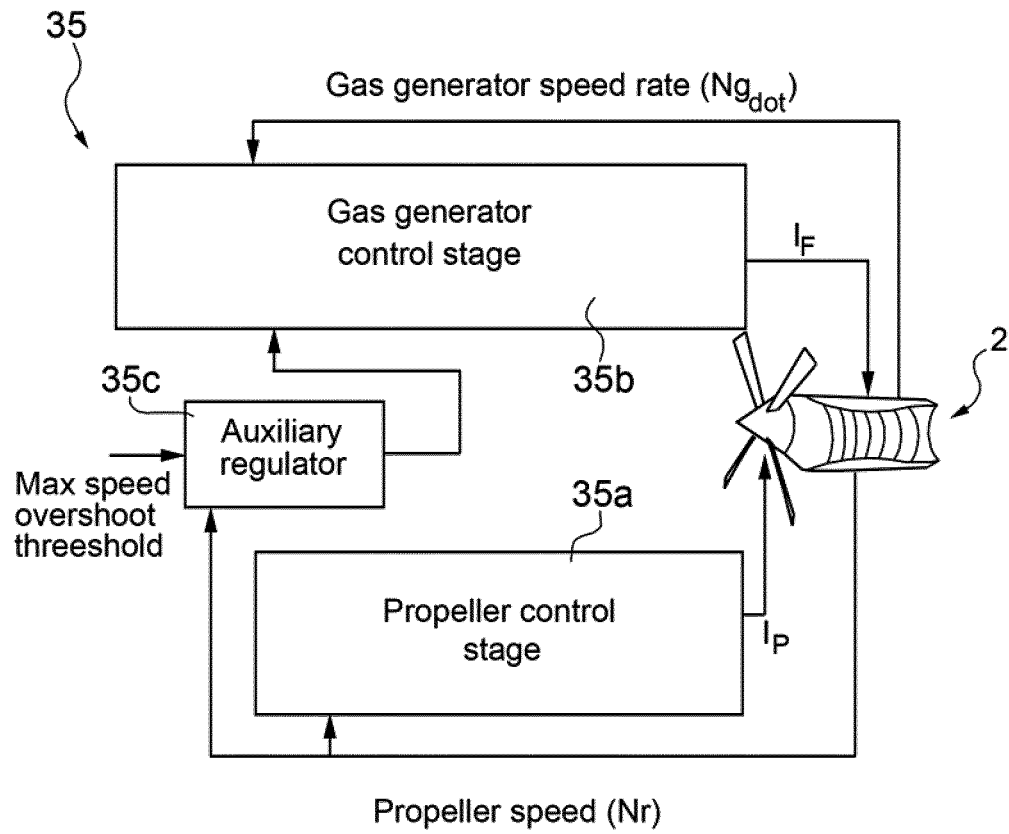
FIG. 5 is a schematic block diagram of a control system of the turbopropeller, according to the present solution.

As shown in FIG. 5, the control system 35 comprises a propeller control stage 35a, implementing a closed loop control aimed at controlling the propeller speed Nr based on a scheduled propeller speed reference $Nr_{ref}$ and at least a feedback measure. In particular, the propeller control stage 35a is configured to generate a driving quantity $I_P$, for example an electrical current, designed to drive the actuation assembly 29 of the propeller assembly 3 to set a controlled pitch angle $\beta$ of the propeller blades 10, and to receive, as a feedback measure, at least a measure of the propeller speed Nr; a measure of the pitch angle $\beta$ may also be received by the propeller control stage 35a, as a further feedback measure.

The control system 35 further comprises a gas generator (or turbine) control stage 35b, implementing a respective closed loop control aimed at controlling the engine power based on a scheduled reference and at least one feedback measure. In particular, the gas generator control stage 35b is configured to generate a respective driving quantity $I_F$, for example an electrical current, designed to drive a fuel metering unit to set a controlled amount of fuel (or fuel rate) $W_f$ for the gas turbine engine 20, and to receive, as a feedback, at least the gas generator acceleration Ngdot (that may be determined from a sensed gas generator speed Ng); a measure of the engine torque TQ or thrust may also be received by the gas generator control stage 35b, as a further feedback measure.

As will be discussed in more detail in the following, according to a particular aspect of the present solution, the electronic control system 35 further comprises an auxiliary control stage 35c, which couples the propeller control stage 35a and the gas generator control stage 35b and is configured to determine a limitation of the operation of the gas turbine engine 20, in particular a limitation of the engine power increase (as will be discussed in detail, achieved by limiting a reference of the gas generator acceleration control), if a propeller speed overshoot is detected (i.e. if the propeller speed has a given relation with a propeller speed overshoot threshold).

According to an embodiment, the auxiliary control stage 35c is configured to acquire a measure of the propeller speed from the propeller control stage 35a, and to determine a limitation to the fuel provided to the gas turbine engine 20, based on the relation between the propeller speed and the propeller speed overshoot threshold. In particular, the auxiliary control stage 35c is configured to limit a scheduled reference used by the gas generator control stage 35b, in order to cause the desired limitation of engine power increase.

Figure 6:
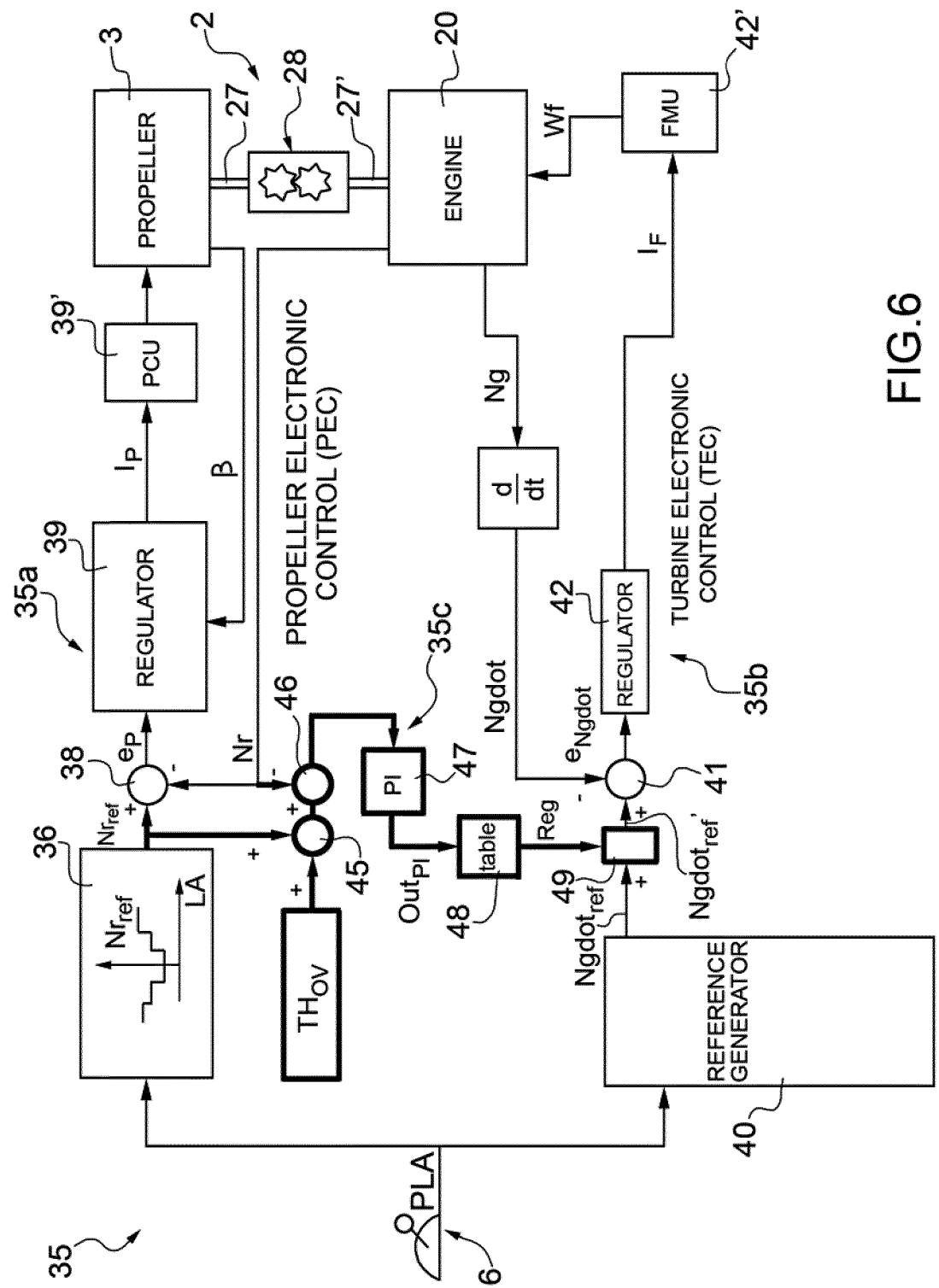
FIG. 6 is a more detailed block diagram of the control system of FIG. 5, according to a possible embodiment.

A possible embodiment of control system 35 is now discussed in more details with reference to FIG. 6.

The propeller control stage 35a, implementing the propeller electronic control (PEC) to adjust propeller blade pitch angle $\beta$ to control the propeller speed Nr, comprises:

- a first reference generator 36, including a first scheduler configured to receive a lever angle signal PLA indicative of the positioning angle of the operator-manipulated input device 6; it determines a value of the reference propeller speed $Nr_{ref}$ (corresponding to the positioning angle of the lever 6), according to a preset schedule that characterizes turbopropeller engine operation (e.g. provided by the manufacturer and stored in the non-volatile memory of the processing unit of the electronic control system 35);

a first adder block 38, receiving at a first (positive, or summation) input the reference propeller speed $Nr_{ref}$ and at a second (negative, or subtraction) input a measure of the propeller speed Nr, as a feedback, measured by a suitable sensor coupled to the turbopropeller engine 2, and providing at the output a propeller speed error $e_p$, as a function of the subtraction between the reference propeller speed $Nr_{ref}$ and the measured propeller speed Nr (in a possible embodiment, the measured propeller speed Nr corresponds to the rotational speed of the power turbine shaft 27'); and a first regulator 39, receiving at its input the propeller speed error $e_p$ and a measure of the pitch angle β, measured at the propeller assembly 3, and generating at its output, based on a regulation scheme, the first driving quantity $I_P$, for example an electrical current, which is provided to a propeller control unit 39', designed to control actuation of the actuation assembly 29 moving the pitch angle β of the propeller blades 10 (according to propeller speed error $e_p$ in alpha control mode, during forward operation, or directly the pitch angle β in beta control mode, e.g. during reverse operation).

The gas generator control stage 35b, implementing the turbine electronic control (TEC) to adjust the fuel rate $W_f$ to control engine power, in turn comprises:

a second reference generator 40, configured to receive the signal PLA indicative of the input power request and to determine a value of a scheduled gas generator acceleration reference $Ngdot_{ref}$;

a second adder block 41, receiving at a first (positive, or summation) input a control reference $Ngdot_{ref}'$, being a function of the scheduled gas generator acceleration reference $Ngdot_{ref}$ (as discussed in the following) and at a second (negative, or subtraction) input a gas generator acceleration Ngdot, as a feedback (which may be measured by a suitable sensor coupled to the gas turbine engine 20 or, as in the shown embodiment, be the first order derivative of a measured gas generator speed Ng, which may correspond to the rotational speed of the gas generator shaft 25), and providing at the output a gas generator acceleration error $e_{Ngdot}$, as a function of the subtraction between control reference $Ngdot_{ref}'$ and gas generator acceleration Ngdot; and a second regulator 42, receiving at its input the gas generator acceleration error $e_{Ngdot}$, and generating at its output, based on a regulation scheme aimed at minimizing the same gas generator acceleration error $e_{Ngdot}$, the second driving quantity $I_F$, for example an electrical current, which is provided to a fuel metering unit 42', designed to control the fuel rate $W_f$ provided to the gas turbine engine 20.

In the discussed embodiment, the auxiliary control stage 35c is configured to acquire the measure of the propeller speed Nr and the reference propeller speed $Nr_{ref}$ from the propeller control stage 35a, and to cause a limitation to the engine power if the measured propeller speed Nr overcomes the reference propeller speed $Nr_{ref}$ by a given overshoot value, i.e. the propeller speed overshoot threshold, here denoted with $TH_{ov}$.

In particular, the auxiliary control stage 35c is configured to determine the control reference $Ngdot_{ref}'$, based on the gas generator acceleration reference $Ngdot_{ref}$ at the output of the second reference generator 40 and based on the difference between the sum of the reference propeller speed $Nr_{ref}$ and the propeller speed overshoot threshold $TH_{ov}$, and the measured propeller speed Nr.

The auxiliary control stage 35c therefore comprises:

a third adder block 45, receiving at a first (positive, or summation) input the propeller speed overshoot threshold $TH_{ov}$ and at a second (also positive, or summation) input the reference propeller speed $Nr_{ref}$, and providing at the output the sum between the same propeller speed overshoot threshold $TH_{ov}$ and the same reference propeller speed $Nr_{ref}$ ($Nr_{ref}+TH_{ov}$);

a fourth adder block 46, receiving at a first (positive, or summation) input the above sum $Nr_{ref}+TH_{ov}$, from the output of the third adder block 45, and at a second (negative, or subtraction) input the measured propeller speed Nr, and providing at the output the difference between the same sum $Nr_{ref}+TH_{ov}$ and the propeller speed Nr (($Nr_{ref}+TH_{ov}$)−Nr);

a third regulator 47, in the example of the PI (Proportional Integral) type, coupled to the output of the fourth adder block 46, so as to receive the above difference ($Nr_{ref}+TH_{ov}$)−Nr, and configured to generate a regulation output $Out_{PI}$ as a function of the value of the same difference (i.e. as a function of the difference between the reference propeller speed $Nr_{ref}$ plus the propeller speed overshoot threshold $TH_{ov}$ and the measured propeller speed Nr);

a conversion-table block 48, receiving the regulation output $Out_{PI}$ from the third regulator 47 and converting the value of the same regulation output $Out_{PI}$, generally ranging from 0% to 100%, into a regulation value Reg, being a scalar lower than or equal to 1, i.e. comprised between a minimum value (higher than 0) and 1, according to a suitable conversion table; and a multiplication block 49, receiving at a first multiplication input the scheduled gas generator acceleration reference $Ngdot_{ref}$ and at a second multiplication input the regulation value Reg, and providing at the output the control reference $Ngdot_{ref}'$, being limited as the result of the multiplication between the scheduled gas generator acceleration reference $Ngdot_{ref}$ and the above regulation value Reg, which thus has a direct action on the control reference $Ngdot_{ref}'$.

The minimum value of the regulation value Reg may be, for example, equal to 0.2, thereby determining a maximum reduction of 80% of the scheduled gas generator acceleration reference $Ngdot_{ref}$ (and a corresponding reduction of the engine power increase rate). In more general terms, the above minimum value is set as a function of a desired maximum intervention of the auxiliary control stage 35c in the control action exerted by the electronic control system 35; for example, a minimum value of 0.5 at the output of the conversion-table block 48 determines a maximum reduction of 50% of the scheduled gas generator acceleration reference $Ngdot_{ref}$ (and thus a lower intervention by the auxiliary control stage 35c with respect to the previously considered example). The conversion-table block 48 in any case determines a correspondence between the regulation output $Out_{PI}$, generally comprised in the full range 0%-100%, and the desired range for the regulation value Reg, comprised between the desired minimum value and 1 (the latter value corresponding to a 100% value of the same regulation output $Out_{PI}$).

The present Applicant has realized that it may not be convenient to have a minimum value of the regulation value Reg lower than 0.2 (and correspondingly a maximum reduction of the scheduled gas generator acceleration reference Ngdot$_{ref}$ higher than 80%), in order to maintain a sufficient acceleration capability for the gas turbine engine 20.

During operation, when the propeller speed Nr is in steady state (i.e. the value of the same propeller speed Nr is lower than the sum Nr$_{ref}$+TH$_{ov}$), the error at the input of the third regulator 47 is positive, so that the same regulator will saturate to the 100% value. In this case, the regulation value Reg is equal to 1 and the auxiliary control stage 35c therefore does not affect at all the operation of the electronic control system 35, in particular of the gas generator control stage 35b implementing the turbine electronic control unit (TEC).

When the propeller speed Nr instead overcomes the reference propeller speed Nr$_{ref}$ by a value higher than propeller speed overshoot threshold TH$_{ov}$ (i.e. the value of the same propeller speed Nr is higher than the sum Nr$_{ref}$+ TH$_{ov}$), the third regulator 47 starts to operate, decreasing its regulation output Out$_{PI}$ to decrease the acceleration reference so that less fuel will be supplied to the gas turbine engine 20, thereby determining a reduction of the power increase rate.

The advantages of the present solution are clear from the previous discussion.

In any case, it is again underlined that the present solution allows to achieve an improved control action, in particular limiting propeller speed overshoot and thus reducing the risk of propeller overspeed and possible engine damages.

Figure 1:
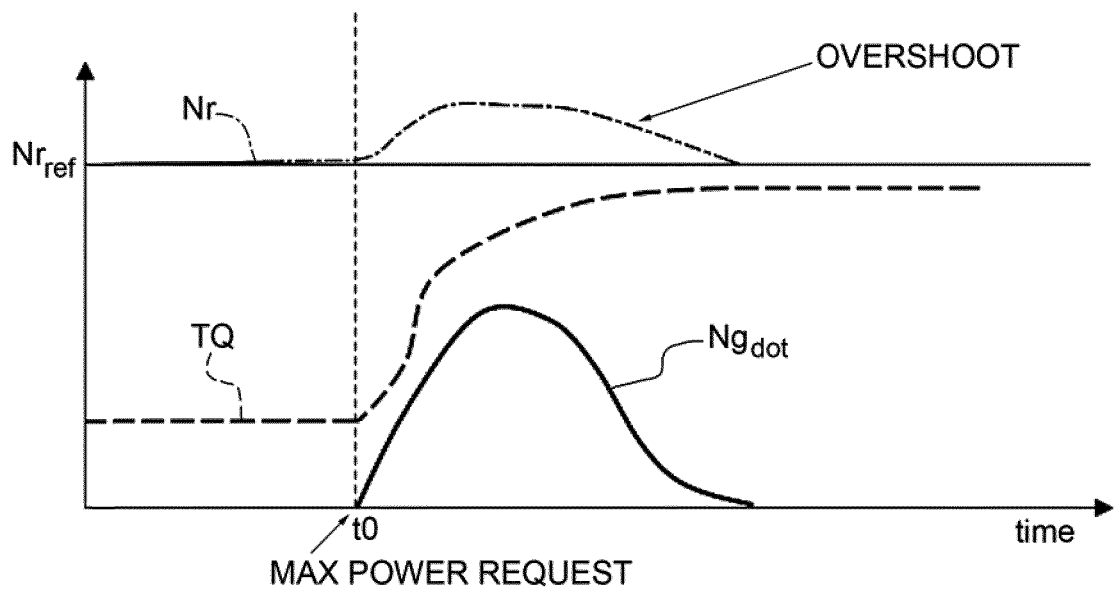
FIG. 1 is a plot of quantities related to turbopropeller operation in the presence of a propeller speed overshoot, relating to a known control solution.
Figure 7:
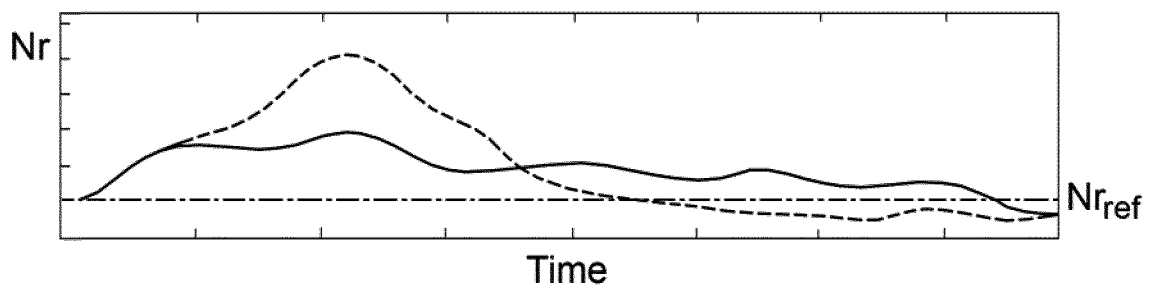
FIG. 7 shows plots of a propeller speed overshoot, comparing the performance of the present solution with respect to a known control solution.

In this regard, FIG. 7 shows a comparison between the overshoot of the propeller speed Nr in a traditional control solution (as previously shown in FIG. 1), depicted with a dashed line, and the overshoot of the propeller speed that may be obtained with the present control solution, shown with a continuous line. In particular, the present solution allows to greatly reduce the amount of overshoot and more importantly exerts a control action on the same overshoot, which is instead not controlled in any manner in the traditional solutions. The overshoot of the propeller speed Nr in FIG. 7 is, in the example, the result of a rapid increase rate of the requested power, as was previously discussed with reference to FIG. 1.

Advantageously, the present solution allows to limit the propeller speed overshoot, and at the same time does not entail any limitation by the control action on the scheduled acceleration during normal operating conditions (i.e. when the propeller speed Nr does not overcome the propeller speed reference Nr$_{ref}$ by a value higher than the overshoot threshold TH$_{ov}$), thus not impairing normal engine performance.

The present solution indeed limits propeller speed overshoot, maintaining the possibility to have arbitrary fast engine accelerations at altitude conditions and desired aircraft speed; in other words, the present solution allows to achieve a proper propeller speed limitation regardless of the engine acceleration schedule.

Finally, it is clear that modifications and variations can be made to what is described and illustrated herein, without thereby departing from the scope of the present invention as defined in the appended claims.

In particular, it is underlined that different implementations could be envisaged for the propeller control stage 35a and/or the gas generator control stage 35b in the electronic control system 35, without however implying any modification to the discussed solution for limiting propeller speed overshoot. In particular, a further regulator could be envisaged in the propeller control stage 35a, e.g. based on the pitch angle β (during "beta mode", for reverse engine operation), cooperating with the first regulator 39; likewise, further regulators could be envisaged in the gas generator control stage 35b, e.g. based on a torque or a measure of the gas generator speed, cooperating with the second regulator 42.

Moreover, it is underlined that, although generally valid for a fixed-wing aircraft, the present disclosure may further apply to rotary-wing aircraft, tilt-rotor aircraft, or other apparatuses including a pitch-changing propeller assembly and a gas generator coupled to the aircraft.

The invention claimed is:

1. An electronic control system for a turbopropeller having a gas turbine engine and a propeller assembly coupled to the gas turbine engine, the control system comprising:
   a propeller control stage configured to implement a closed loop control for controlling operation of the propeller assembly based on a scheduled propeller speed reference and a propeller speed measure;
   a gas turbine control stage configured to implement a closed loop control for controlling operation of the gas turbine engine; and
   an auxiliary control stage coupling the propeller control stage and the gas turbine control stage and configured to determine a limitation of the operation of the gas turbine engine if a propeller speed overshoot is detected with respect to the propeller speed reference.

2. The control system according to claim 1, wherein the gas turbine control stage is configured to control a fuel rate provided to the gas turbine engine for controlling a power generated by the gas turbine engine, and wherein the auxiliary control stage is configured to determine a limitation to the fuel rate provided to the gas turbine engine.

3. The control system according to claim 1, wherein the auxiliary control stage is configured to acquire from the propeller control stage the scheduled propeller speed reference and the propeller speed measure, and to determine the limitation of the operation of the gas turbine engine, if the propeller speed measure overcomes the scheduled propeller speed reference by more than a speed overshoot threshold.

4. The control system according to claim 3, wherein the gas turbine control stage is configured to implement the closed loop control for controlling operation of the gas turbine engine based on a scheduled reference and at least a feedback quantity; and wherein the auxiliary control stage comprises an auxiliary regulator, configured to determine a modification of the scheduled reference for the gas turbine control stage, based on a difference between the sum of the scheduled propeller speed reference and the speed overshoot threshold, and the propeller speed measure.

5. The control system according to claim 4, wherein the auxiliary regulator is configured to generate a regulation output as a function of said difference and to determine said modification to the scheduled reference based on the regulation output.

6. The control system according to claim 5, wherein the auxiliary control stage further comprises:
   a conversion-table block configured to receive the regulation output from the auxiliary regulator and to convert the value of said regulation output into a regulation value, being a scalar comprised between a minimum value, higher than 0, and 1, according to a conversion table; and
   a multiplication block configured to receive at a first multiplication input the scheduled reference and at a second multiplication input the regulation value, and to provide at its output a limited reference being a result of the multiplication between the scheduled reference and the regulation value.

7. The control system according to claim 6, wherein a gas generator control stage comprises:
a reference generator configured to receive a signal indicative of an input power request and to determine the scheduled reference based on said signal; and
a regulator configured to generate a driving quantity designed to drive a fuel metering unit to set a controlled fuel rate for the gas turbine engine, based on an error being a function of the difference between said limited reference and said feedback quantity.

8. The control system according to claim 4, wherein the scheduled reference of the gas turbine control stage represents a reference value of a gas generator acceleration in the gas turbine engine.

9. The control system according to claim 1, wherein the propeller control stage comprises:
a respective reference generator configured to receive a signal indicative of an input power request and to determine the scheduled propeller speed reference based on said signal; and
a respective regulator configured to generate a respective driving quantity for an actuation assembly controlling a pitch angle of propeller blades of the propeller assembly, based on a propeller speed error being a function of the difference between the scheduled propeller speed reference and the propeller speed measure.

10. The control system according to claim 1, wherein the propeller speed overshoot is due to a power increase request during flight.

11. A turbopropeller for an aircraft, comprising:
a gas turbine engine;
a propeller assembly coupled to the gas turbine engine via a gearbox assembly; and
the electronic control system according to claim 1.

12. An aircraft comprising the turbopropeller according to claim 11.

13. A control method for a turbopropeller having a gas turbine engine and a propeller assembly coupled to the gas turbine engine, the control method comprising:
implementing a first closed loop control for controlling operation of the propeller assembly based on a scheduled propeller speed reference and a propeller speed measure;
implementing a second closed loop control for controlling operation of the gas turbine engine; and
implementing an auxiliary control coupling the first and second closed loop controls, to determine a limitation of the operation of the gas turbine engine, if a propeller speed overshoot is detected with respect to the propeller speed reference.

14. The control method according to claim 13, wherein implementing the auxiliary control comprises:
acquiring the scheduled propeller speed reference and the propeller speed measure, and
determining a limitation to a fuel rate provided to the gas turbine engine and to a power increase thereof, if the propeller speed measure overcomes the scheduled propeller speed reference by more than a speed overshoot threshold.

15. The control method according to claim 14, wherein implementing the second closed loop control for controlling operation of the gas turbine engine comprises comparing a scheduled reference and at least a feedback quantity; and wherein determining the limitation comprises determining a modification of the scheduled reference for the second closed loop control, based on the difference between the sum of the scheduled propeller speed reference and the speed overshoot threshold, and the propeller speed measure.

* * * * *